United States Patent
Cooley et al.

(10) Patent No.: US 8,914,786 B2
(45) Date of Patent: Dec. 16, 2014

(54) SYSTEMS AND METHODS FOR CONTROLLING APPLICATION UPDATES ACROSS A WIRELESS INTERFACE

(75) Inventors: James W. Cooley, Seattle, WA (US); Neal E. Tucker, Seattle, WA (US)

(73) Assignee: Zumobi, Inc., Seattle, WA (US)

( * ) Notice: Subject to any disclaimer, the term of this patent is extended or adjusted under 35 U.S.C. 154(b) by 1308 days.

(21) Appl. No.: 11/956,253

(22) Filed: Dec. 13, 2007

(65) Prior Publication Data
US 2012/0210313 A1  Aug. 16, 2012

(51) Int. Cl.
*G06F 9/44* (2006.01)
*G06F 9/445* (2006.01)

(52) U.S. Cl.
CPC .. *G06F 8/65* (2013.01); *G06F 8/60* (2013.01); *G06F 8/67* (2013.01)
USPC ............ 717/171; 717/168; 717/170; 717/176

(58) Field of Classification Search
CPC ................ G06F 8/65; G06F 8/60; G06F 8/67
USPC ......................................................... 717/171
See application file for complete search history.

(56) References Cited

U.S. PATENT DOCUMENTS

| | | | | |
|---|---|---|---|---|
| 5,694,537 | A * | 12/1997 | Montenegro et al. ............. | 714/12 |
| 5,708,711 | A * | 1/1998 | Rosauer et al. ................ | 380/273 |
| 6,687,901 | B1 * | 2/2004 | Imamatsu ..................... | 717/173 |
| 7,024,491 | B1 | 4/2006 | Hanmann et al. | |
| 7,437,169 | B2 * | 10/2008 | Khoury et al. ................. | 455/466 |
| 7,463,631 | B2 * | 12/2008 | Bao et al. ..................... | 370/394 |
| 7,584,467 | B2 * | 9/2009 | Wickham et al. ............. | 717/171 |
| 7,707,570 | B2 * | 4/2010 | Yoshimura et al. ........... | 717/170 |
| 7,783,733 | B1 * | 8/2010 | Yip et al. ...................... | 709/223 |
| 2002/0069298 | A1 | 6/2002 | Birkler et al. | |
| 2002/0188937 | A1 * | 12/2002 | Webster et al. ................ | 717/171 |
| 2003/0065738 | A1 * | 4/2003 | Yang et al. .................... | 709/215 |
| 2003/0081621 | A1 * | 5/2003 | Godfrey et al. ............... | 370/400 |
| 2003/0233648 | A1 * | 12/2003 | Earl et al. ...................... | 717/176 |
| 2004/0073901 | A1 * | 4/2004 | Imamatsu ..................... | 717/170 |
| 2004/0109436 | A1 * | 6/2004 | Vargas et al. .................. | 370/350 |
| 2004/0255287 | A1 * | 12/2004 | Zhang et al. .................. | 717/171 |
| 2004/0261071 | A1 * | 12/2004 | Chuang et al. ................ | 717/170 |
| 2005/0076333 | A1 * | 4/2005 | Leclair et al. ................. | 717/176 |
| 2005/0120346 | A1 * | 6/2005 | Sprigg .......................... | 717/176 |
| 2005/0147130 | A1 | 7/2005 | Hurwitz et al. | |

(Continued)

OTHER PUBLICATIONS

Gotz Alefeld, Interval analysis: theory and applications, 1999, pp. 421-443.*

(Continued)

*Primary Examiner* — Thuy Dao
*Assistant Examiner* — Mongbao Nguyen
(74) *Attorney, Agent, or Firm* — Fulbright & Jaworski LLP

(57) ABSTRACT

Various embodiments of the present invention are directed to systems, methods, and compute program products for managing connections between a mobile device and a network server over a network connection in a bandwidth-efficient manner. In one embodiment, a mobile device includes a processor, and there are a plurality of services executed by the processor, each of the services receiving information updates over a network connection from a server. At least one update interval function executed by the processor assigns an update interval to each of the services, the update intervals governing when each of the respective services request updated information over the network connection.

18 Claims, 6 Drawing Sheets

(56) References Cited

U.S. PATENT DOCUMENTS

| | | | |
|---|---|---|---|
| 2005/0257214 A1* | 11/2005 | Moshir et al. | 717/171 |
| 2006/0112380 A1* | 5/2006 | Heller et al. | 717/168 |
| 2006/0184927 A1* | 8/2006 | Deblaquiere et al. | 717/168 |
| 2007/0019793 A1* | 1/2007 | Cheng | 379/88.01 |
| 2007/0156706 A1* | 7/2007 | Hayes | 707/10 |
| 2008/0005732 A1* | 1/2008 | Coon | 717/168 |
| 2008/0049714 A1 | 2/2008 | Commarford et al. | |
| 2008/0141261 A1* | 6/2008 | Machida | 718/104 |
| 2008/0168391 A1 | 7/2008 | Robbin et al. | |
| 2009/0138477 A1* | 5/2009 | Piira et al. | 707/10 |

OTHER PUBLICATIONS

Ana Paula Afonso, Dynamic Channels: a New Development Methodology for Mobile Computing Applications, 1998, pp. 1-22.*

Felix Alcala, UbiLoc: A System for Locating Mobile Devices using Mobile Devices, 2004, pp. 1-6.*

U.S. Appl. No. 11/690,582, Cooley et al.

U.S. Appl. No. 11/690,591, Cooley et al.

U.S. Appl. No. 11/690,602, Cooley et al.

* cited by examiner

SYSTEMS AND METHODS FOR CONTROLLING APPLICATION UPDATES ACROSS A WIRELESS INTERFACE

CROSS-REFERENCE TO RELATED APPLICATIONS

This patent application is related to concurrently filed, co-pending, and commonly-assigned: U.S. patent application Ser. No. 11/690,582, filed Mar. 23, 2007, entitled "SYSTEMS AND METHODS FOR CONTROLLING APPLICATION UPDATES ACROSS A WIRELESS INTERFACE"; U.S. patent application Ser. No. 11/690,591 filed Mar. 23, 2007, entitled "SYSTEMS AND METHODS FOR COORDINATING THE UPDATING OF APPLICATIONS ON A COMPUTING DEVICE"; U.S. patent application Ser. No. 11/690,602 filed Mar. 23, 2007, entitled "SYSTEMS AND METHODS FOR CONTROLLING GROUP MESSAGING"; the disclosures of which are incorporated herein by reference.

TECHNICAL FIELD

This disclosure relates to wireless bandwidth management and more particularly to systems and methods for adaptive bandwidth management in wireless communication systems and even more particularly to systems and methods for efficiently updating applications that reside on a wireless device.

BACKGROUND OF THE INVENTION

In many situations, such as, for example, when it is required to update or change an application that is running on a mobile device, the updated or new information typically is located on the network side of the wireless interface. Thus that information must then be transmitted across the wireless interface to the device, such as a cell phone, where the application resides.

Several problems exist when attempting to manage such application updates. These problems stem from several factors, one of which is that a typical mobile wireless network has high latency and relatively low bandwidth. In addition, the wireless interface is subject to drop-outs and thus often there is difficulty maintaining a channel. Also, the use of the wireless interface causes battery drain on the mobile device and thus there is always concern as to when transmission occurs and for how long.

An additional set of problems exist when the data exchange is via the HTTP protocol which is a client initiated protocol. In this instance, the client being the mobile device. Thus, the situation exists that the update data resides in the network while the connection must be initiated from the mobile device, all while conserving bandwidth and battery life of the mobile device.

BRIEF SUMMARY OF THE INVENTION

The present invention is directed to systems, methods, and computer program products providing client-side setting of application update intervals. In one embodiment, a single persistent wireless interface connection is maintained in a manner that allows for multiplexing several services over that connection. One or more client side interval update functions calculate appropriate update intervals for the various services in a dynamic manner. Therefore, each service that communicates using the network connection has an update interval associated therewith. By managing the data transfer in accordance with the update intervals, the bandwidth of the total data transfer across the interface is managed so as to conserve battery life and minimize the bandwidth required at any point in time. Update intervals can also be used to maximize cost efficiency by, e.g., increasing intervals or stopping automatic updates altogether when network data costs rise. From time to time, the update interval of any given type of data can be adjusted dynamically depending upon one or more factors that can change over time.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
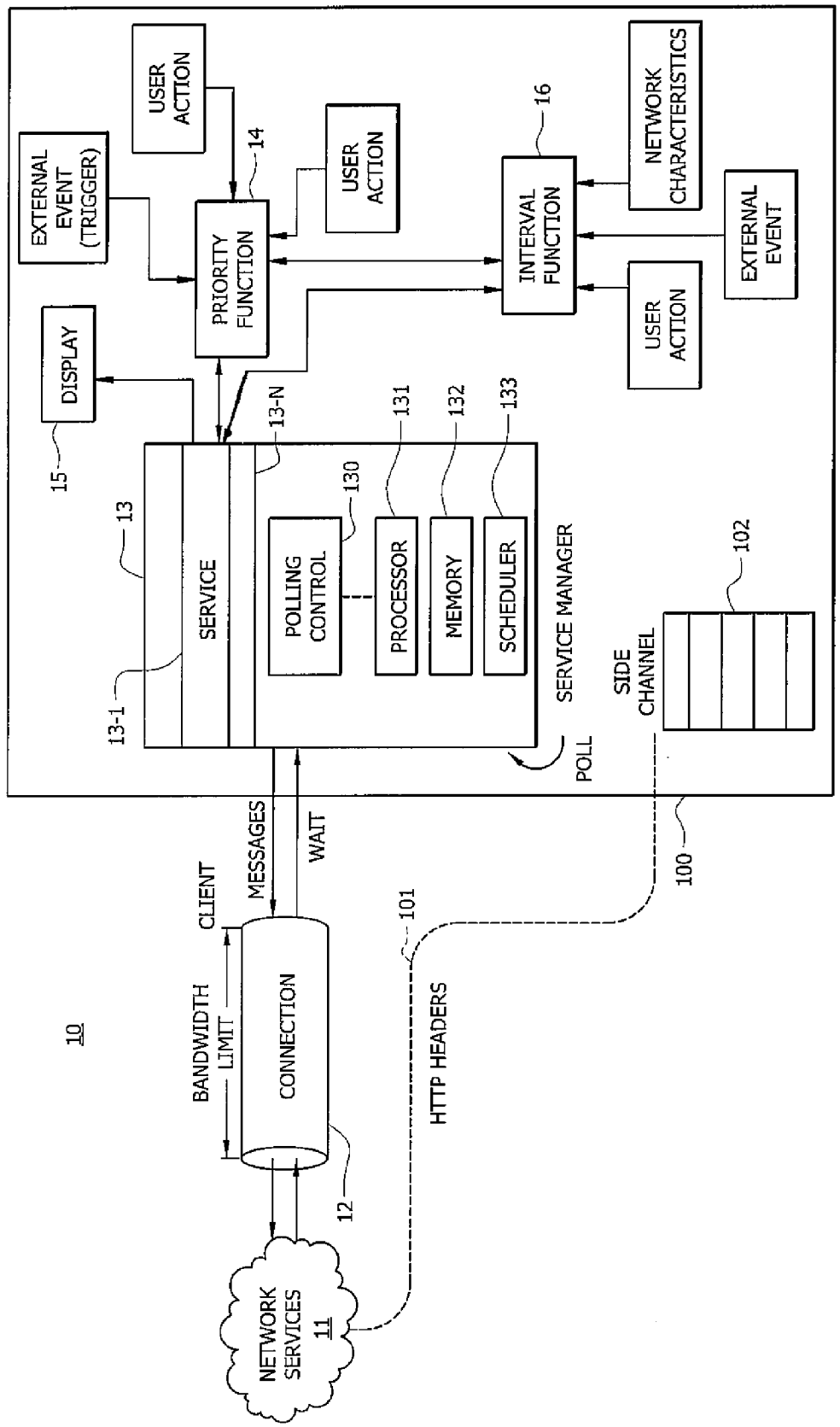
FIG. 1 shows one embodiment of a mobile device utilizing the concepts of the invention.

FIG. 1 shows one embodiment 10 of a mobile device 100 (only a portion of which is illustrated) utilizing the concepts of the invention. Connection 12 exists between device 100 and network server 11. Connection 12 has a bandwidth limitation, either imposed by the physical network or imposed by the user such that the user is only willing to pay for a certain amount of data transmission (often measured in bytes per unit time). Sometimes the cost per byte is less expensive at certain times (such as at night) so the user prefers to use "night" bytes instead of "day" bytes when possible. In fact, many kinds of limitations exist and may be addressed by various embodiments of the invention. For example, there are utilization limitations assigned by networks (WiFi, Edge, UMTS, etc.), user assigned limits (e.g., to control costs), network operator assigned limits, application/service assigned limits, and the like, all of which may be addressed by one or more embodiments.

Device 10 contains service manager 13 which in turn controls various services (or data types) 13-1 to 13-N. Each of the services 13-1 to 13-N has associated therewith a priority function 14. The purpose of each service 13-1 through 13-N is to perform a particular function (application) that ultimately results in data displayed to the user via display 15. Each service 13-1 through 13-N requires some time (bandwidth) on the wireless interface and service manager 13 balancing each bandwidth request against all other service bandwidth requests against a number of factors. The priority of each service is incorporated into the priority function for each service. Since the overall connection has a bandwidth limit, the availability of the connection to any particular service is balanced across all services according to an individual priority function associated with each service. Since the output of the priority function for a given service can change from time to time (as well as the function itself), the use of the connection is dynamically balanced according to a complex and changing set of criteria, which may include user load patterns, behavior, or any characteristic or behavior expressed by the user (direct or through observation) that may be quantified. Thus, the system will indirectly balance itself in accordance with each user's needs and desires. This adaptation can use a variety of functions, such as, for example, linear, moving average, digital filter (FIR, IIR), Bayesian or support vector machine and can support active, adaptive or designed balancing or combinations thereof.

For example, assume a user desires to use only one megabyte per day. That megabyte is rationed out in some order during the day according to a plan for that user. The plan can, for example, be based on statistics or any stochastic process, for example, selecting a service to run (out of multiple services) for the current interval based on a number or value associated with that service, the value of which is determined dynamically according to a function as described. This function may be different for different services or for different users, or on any one of many other techniques, such as, for example, probability of usage of target application or data, neural network, location-based function, GPS.

In a system with scarce resources (e.g., bandwidth), there will typically be multiple competing services at any one interval. As the number of resources increases and the number of services stays the same, competition at any given interval decreases. Systems may be managed by using techniques that modify the interval for a given service and/or alter the instantaneous priority (the priority during the current interval). Both of these values are produced through a function that may operate according to multiple techniques and consider complex criteria. In many systems, there is not a single function for calculating all priorities and intervals, but rather a separate function may be employed on each type of service (or each individual service) and may vary by application and user. The air transport time is then rationed at so many megabytes per hour, if desired. The service manager then will only allow the connection to be used up to the threshold limit. To accomplish this, the service manager periodically pulls through the list of services that require bandwidth and processes the highest priority service first until it reaches the bandwidth limit set for the connection. The service manager then waits until the next pulling interval and repeats the process. The priority functions themselves are constantly changing their priority levels and thus at each polling opportunity the highest priority functions are served first. The services are also changing their polling intervals at each opportunity in concert or independently with the changes in priority.

For example, assume that a user desires to have a weather application, a news application and a sports application. The weather application may have a high priority assigned to it during the hours of 6 AM to say 9 AM. Thus, during these hours the weather information is updated every, say ten minutes. Likewise, the news application has a high priority in the morning but then switches so that only "breaking" news stories are reported during the day. The sports application has a priority such that scores are reported only at 6 AM and then again only at 10 PM, except that when a favorite team (or teams) are actually playing then the priority changes to every five minutes.

Another example would be when the user performs an action, such as pressing a key or changing the view on the display. This action then could immediately change the priority function of the associated application (service). This then would allow the service manager to control updates on a more immediate basis.

Many wireless devices, such as for example, cellular telephones, allow communications over several channels, One such channel is a main two-way real time channel which is typically used for concurrent bidirectional speech communications. Another channel, for example, is a data channel that could be used separately from the speech channel. While the concepts discussed herein can be used on either channel, it is expected that the service manager will use the data channel. During the time the service manager is managing the connection, there can be a side channel of HTTP headers, such as headers 101. These side channel headers piggyback on other messages. For instance, if service A is communicating with server 11, service B can also communicate with the server at the same time on the same message using a side channel message such as message 102.

The purpose of the side channel is to process certain class of service requests that are small but frequent or potentially frequent, but where it is not necessary to establish an explicit transaction on the network. Thus, when one service makes a request and gets a response, several other services can have their small but important requests multiplexed on the established requests so that they effectively share that time slice. An example would be for an application to check for the presence of an update such that if an update exists (i.e. there is a "flag" set). Thus, the flag message can serve to allow time to be scheduled for the actual updating of the application.

Note that while FIG. 1 shows a single manager and only one connection, in actuality there can be many connections, each with a service manager. In one embodiment, each connection is to a separate URL and thus there is a one to one relationship between the service manager and a connection. In this embodiment, all services which connect to the same host (URL) are associated with the same single service manager and with the same connection. In this manner when processing service requests, the system can connect to the same host and port and thus the connection can be opened only once for all the applications that communicate with the same server. This reduces the overhead of the communication by leaving the socket open for multiple services. In turn, this reduces battery usage because the device radio is used less.

Another example of dynamic function changing is when messages are being sent back and forth to another mobile device. The user then wants the message sending and receiving service to have a high priority during this exchange but then also wants that priority to taper off over time as the conversation dies so that the device does not use up a lot of network bandwidth checking for messages. The priority function could be anything that is reset by user actions. Examples of priority changes are: periodic, constant, decreasing priority, increasing priority.

Another example would be using statistics about times when network access has been accomplished or when things are available. This would work well for applications that change over time, such as a traffic map. The priority function would track and the changes in traffic patterns during, for example, rush hours and could therefore dynamically increase and decrease it's priority assigned to updating the information from the server.

The priority could be tailored to usage. For instance, if the user always begins his/her day by looking at the traffic information, then checking the news and then looking at the weather icon on the display. These items can be clustered to update as a group. Using this arrangement, the system might be a little late on traffic, but will be ahead on the other services in that group. For a flight icon (tile), for instance, one of things that affects the priority might be the proximity in time to the flight. As the flight time approaches, the priority can go higher for updating departure and gate information. The system might update once a day when the flight is a couple of days out, and then start updating at, say, 15 minute intervals, when it is within a few hours of flight time.

Also, the system might have a flight tile that contains several airlines on it. When the tile is selected the system could determine which airline has the highest priority from the several possible airlines on the tile with the priority based on calendar information available to the system. Thus, if the user is booked on an American Airlines flight the user probably does not need an update of Continental flights at that point in time.

Thus, by having access to other information, the priority of the information into the phone can be managed consistent with reducing bandwidth and battery drain in order to give the user increased value from the device. Thus, when it is snowing outside, the phone could sound an alarm earlier than normal to alert the user to longer commute times based on the knowledge of the weather and the user's calendar of scheduled activities.

Alternatively to, or in addition to, priority functions (e.g., function 14), embodiments of the present invention employ interval functions, such as interval function 16. For example, system 10 uses interval function 16 to manage services 13-1 to 13-N as they communicate over connection 12 by setting the intervals at which they update. Many embodiments manage the setting of updating intervals dynamically—that is, as each of services 13-1 to 13-N execute on the client's processor. For example, interval function 16 can be programmed to set an updating interval for a service each time the given service runs or each time a user accesses the given service. Service manager 13 then uses then controls the update requests according to the set intervals.

The calculation of the interval is based on one or more factors. For instance, factors such as user behavior, network characteristics, time of day, day of week, hours of operation, battery charge level, and the like may be used to set an interval for a service. For instance, for a stock feed service, interval function 16 would not request the feed after 4:00 P.M., since stock prices in most US markets are not updated after that time. However, during business hours, the updating interval may be based on other factors, including user preference, availability of updates, availability of network bandwidth, and the like.

A factor that is often important in some embodiments is network characteristics, such as price for data transfer, type of network, and home/roaming status. For instance, when a user is roaming, especially internationally, prices for use are much, much higher compared to typical home and domestic prices. Thus, a user typically does not want to use a roaming network abroad, but the same user would typically want to take advantage of the network if the device was tethered to a wire connection or running WiFi (IEEE 802.11 standard). Interval function 16 detects network characteristics and sets intervals in light of such factors. For example, interval function 16 may lengthen intervals or stop all automatic updating when roaming, while enabling automatic updating and/or shortening intervals when connected to a Local Area Network (LAN, such as may employ Ethernet, WiFi, WiMax, and/or the like).

In fact, any of the parameters that can be used to set priority (as described above) can also be used by some embodiments to set updating intervals. Factors that result in priority being increased can also be used to shorten updating intervals, while factors that result in priority being lowered may be used to increase updating intervals. Such factors include, e.g., user action, type of application (e.g., news, weather, traffic, flight information), proximity to user commitment (e.g, flight departure), and the like. Further, priority levels can even be used to assign updating intervals, since priority levels are often good indicators of application importance and relevance at a given time.

As shown in FIG. 1, interval function 16 exists on mobile device 100. Thus, the setting of the update intervals is performed on the client side rather than on the server side in the illustrated example. Client-side interval functions have not been provided in the prior art, due at least in part to an accepted belief that all complex calculations should be performed on servers rather than on handheld devices. This belief has arisen mostly because of limited processing power of handheld devices that caused decreases in user performance as more processing power was consumed. However, very recent trends in hardware have allowed more processing to be performed on handheld devices.

Embodiments of the invention provide one or more advantages over prior art systems. For instance, an advantage of performing interval and priority setting on client devices is that it allows intervals and priorities to be set using local user context. For instance, a user's device often "knows" if a user is roaming, whereas a server on the Internet may not be aware that the user is roaming. Thus, a client-side interval function (e.g., interval function 16) can dynamically set update intervals in response to roaming status, thereby providing a user with greater cost efficiency.

While interval function 16 is shown in FIG. 1 as assigning intervals to each of services 13-1 to 13-N, it should be noted that some embodiments may include one interval function as part of each respective service. For example, some embodiments include interval functions 16-1 through 16-N (not shown), each being part of its respective service 13-1 to 13-N. Embodiments of the invention can use either configuration.

Further, some embodiments include only interval function 16, while other embodiments, such as the one shown in FIG. 1, include both priority function 14 and interval function 16. Embodiments that employ both of priority function 14 and interval function 16 are possible because priority and update intervals are concepts that are complementary, rather than being mutually exclusive. Generally, updating intervals are different from priority settings in various ways. For example, priority settings are usually used to determine which service goes first when two or more services are scheduled to make a request at or near the same time. By contrast, updating intervals determine, at least in part, how often a service makes requests for information.

Typically, priority is more important when there are a number of services that are executing and updating at the same time. Priority can be used to determine which services make their requests first. On the other hand, if there are not a lot of services on a device, then one or more interval functions can stagger the service intervals in time so that the services will not conflict. Further, in a device with many services, an update interval function can provide a way to manage bandwidth use.

Figure 2:
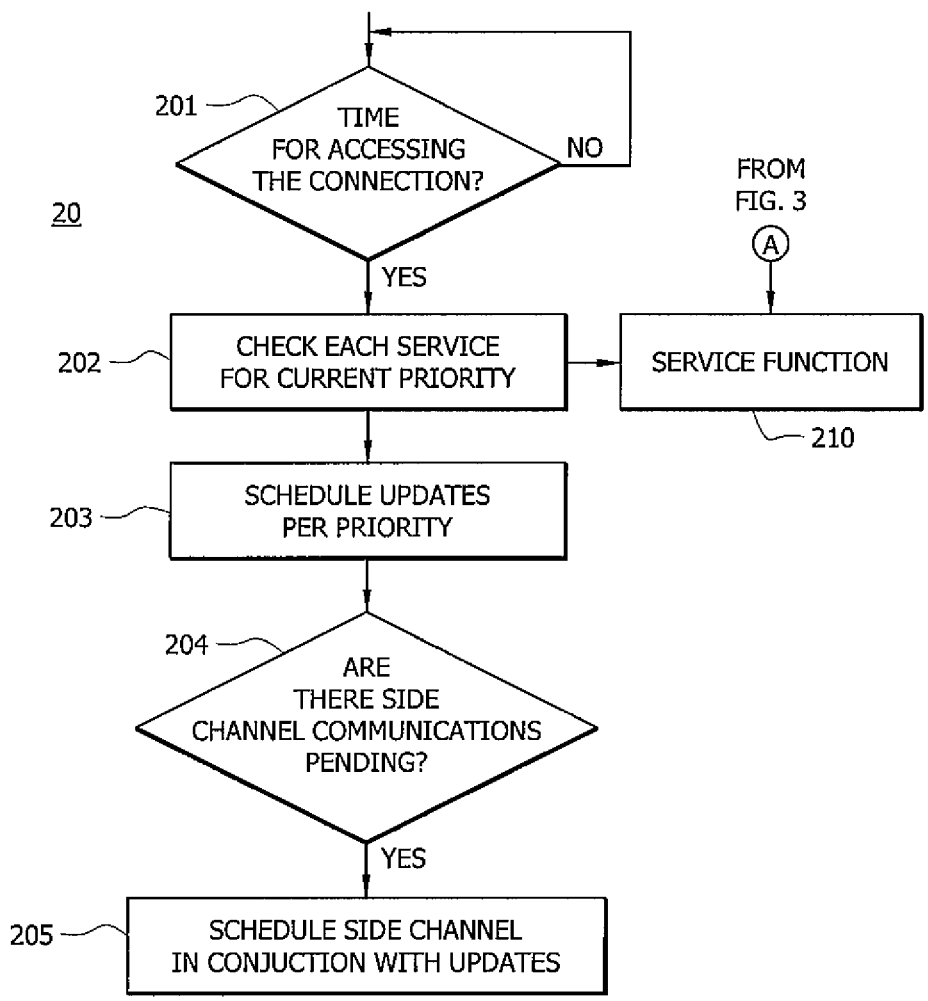
FIGS. 2 and 3 show embodiments of methods for controlling the operation of the application update function of the device shown in FIG. 1.
Figure 3:
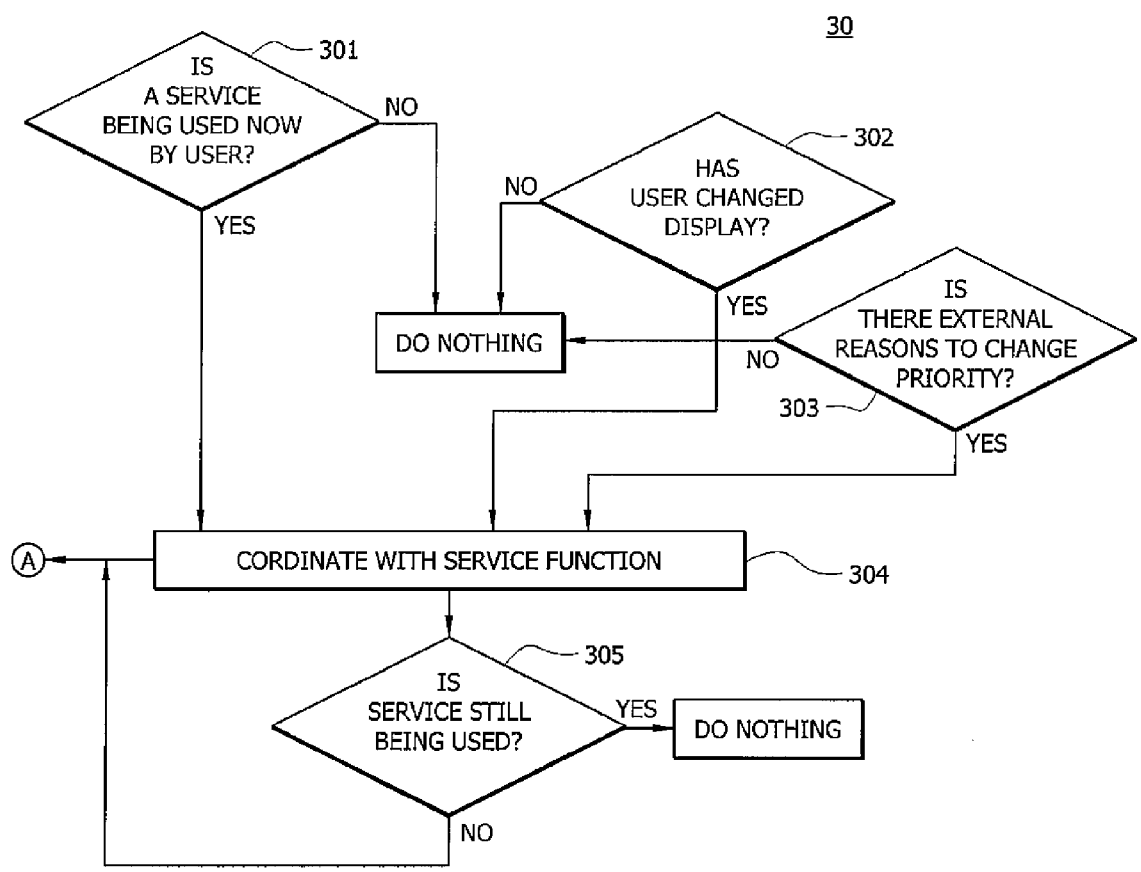

FIGS. 2 and 3 show embodiments of methods for controlling the operation of the application update function of the device shown in FIG. 1. In FIG. 2, embodiment 20 begins with process 201 determining if it is time for accessing a particular network server for those applications which rely on that server for updated information. This time is determined by a combination of calculations based on current battery level, time of day, current activity of the user with respect to the device, how long it has been since the last access to the server, how much data has already been transmitted in a given unit of time, etc. When it is time to make an access, then process 202 checks each service to determine relative priority of that application and then based on the relative priority and the available bandwidth for that connection, as determined by process 201, working in conjunction with process 210, one or more applications are updated by process 203.

Process 204 determines whether there are side channel communications that need to occur, and if so, process 205 schedules those communications.

Processes 301, 302 and 303 of embodiment 30, as shown in FIG. 3, are examples of processes that determine if a priority is to be changed at a particular time. Thus, process 301 determines if a service is being used by the user, process 302 determines if the user has changed the display (for example, by selecting a tile, or a particular service within a tile); and process 303 determines if there is some external reason to change priority. Such an external reason could be, for example, a breaking news story, a sports event going into overtime, weather conditions turning hazardous, etc.

Process 304 then coordinates this information with process 210, as shown in FIG. 2, so as to change the priority of the service. Process 305 determines when a user has stopped using a service. For example, instant messaging is finished and thus the priority for that service can return to its normal priority level. Note that the examples discussed above are only a few of the many factors that can change priority on a dynamic basis and in many situations multiple factors are used to determine relative priority and timing for a network server access, all coordinated to conserve bandwidth and battery life for the user. In one embodiment, the operations in the device are controlled by machine executable code running under control of, for example, processor 131.

Figure 4:
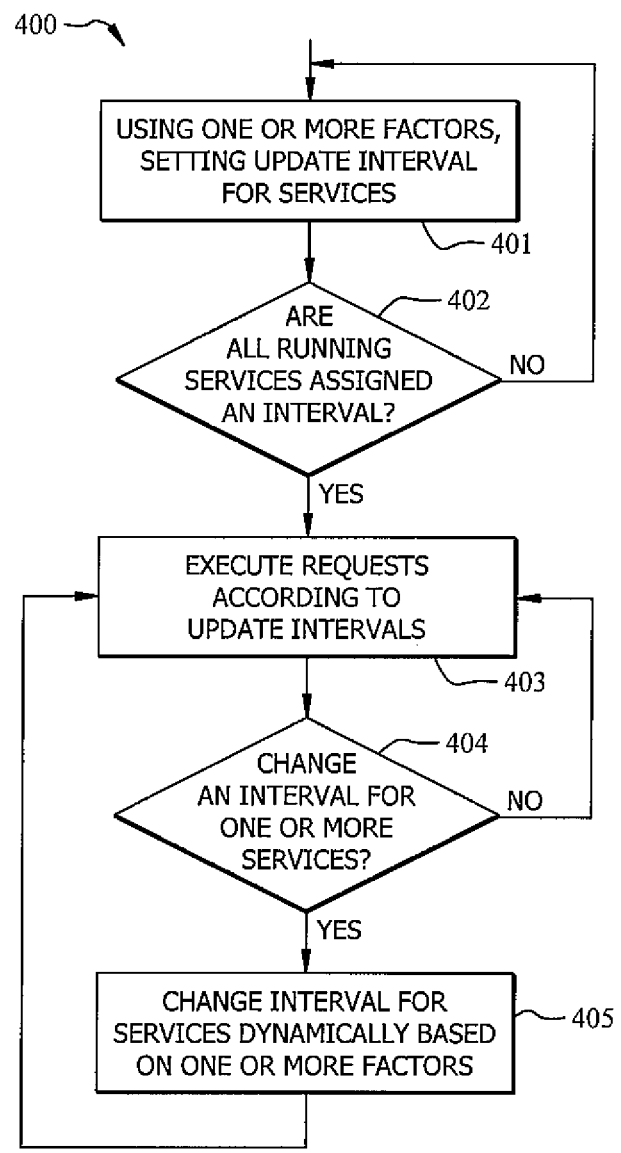
FIGS. 4 and 5 show embodiments of methods for controlling the operation of services according to the interval function of the device shown in FIG. 1.
Figure 5:
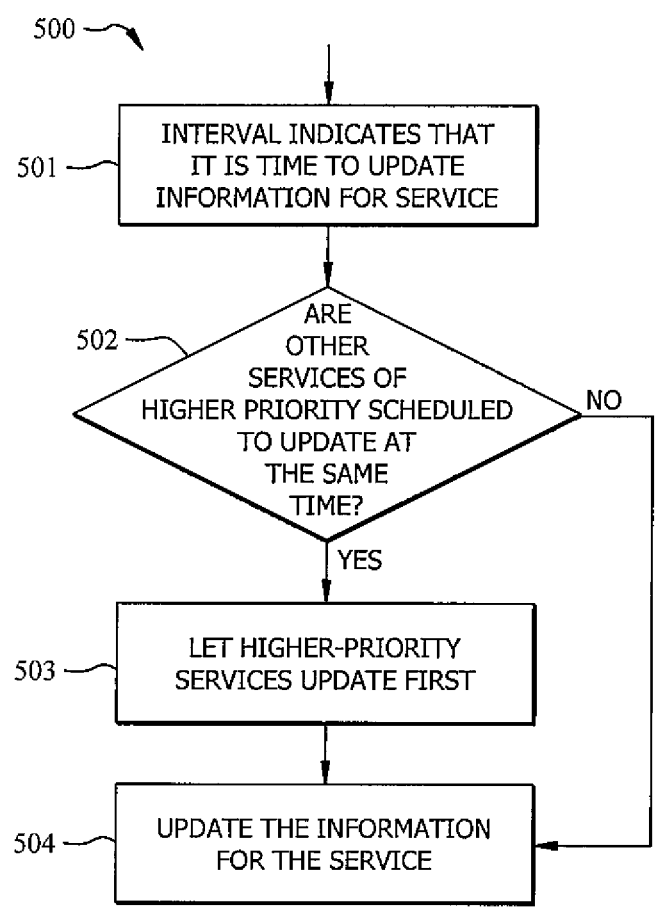

FIGS. 4 and 5 show embodiments of methods for controlling the operation of services according to the interval function of the device shown in FIG. 1. Method 400 is performed, for example, by a handheld device, such as a cellular phone, a handheld computer, an email checking device, a handheld multi-media device, or the like. Specifically, method 400 is performed by a processor on such device as it runs one or more update interval functions (e.g., interval function 16 of FIG. 1).

In step 401, update intervals are set for services on the device using one or more factors. Examples of such factors are discussed above. In the embodiment shown in FIG. 4, the mobile device cycles through all services to assign them update intervals, as shown in steps 401 and 402. However, not all embodiments are limited thereto. Setting updates for a service can be performed at any of a variety of times, such as at boot-up the mobile device, when a service is first run, or any other time.

In step 403, the requests are executed according to the update intervals. For example, some services are updated at different intervals than other services. In step 404, it is determined whether an interval should be changed for one or more services. The interval for a given service can be changed for any of a variety of reasons, including a detected change in one or more factors used to set the intervals (e.g., time of day, roaming status change, etc.), user access of a service, and the like. Step 404 acknowledges that the intervals in various embodiments are set dynamically and change "on the fly" as the mobile device operates. For instance, a mobile device may change intervals for some or all of its services when the device begins roaming.

If there is no reason to change an interval, the method progresses to step 403. If an interval is to be changed, the method progresses to step 405 where the interval is changed based on one more factors. Then, the method progresses to step 403.

Method 400 is exemplary, and other methods within the scope of various embodiments may add, omit, change, or rearrange steps. For instance, as mentioned above, assignments of intervals to services can occur at any of a variety of times during operation of the device further, steps 401-405 may be repeated throughout operation of the device.

Method 500 is an exemplary method for performing service updates according to both priorities and assigned intervals. Method 500 is performed, for example, by a handheld device, such as a cellular phone, a handheld computer, an email checking device, a handheld multi-media device, or the like. Specifically, method 500 is performed by a processor on such device as it runs one or more update interval functions (e.g., interval function 16 of FIG. 1).

In step 501, it is determined that an interval indicates that information should be updated to a service. In step 502, it is discerned whether other services of higher priority are also set to update at the same time. If so, then the higher-priority services are updated first at step 503. If not, then the service is updated according to the set interval at step 504.

Method 500 is exemplary, and other methods within the scope of various embodiments may add, omit, change, or rearrange steps. For instance, steps 501-504 may be repeated throughout operation of the device, and the set interval may change dynamically.

When implemented via computer-executable instructions, various elements of embodiments of the present invention are in essence the software code defining the operations of such various elements. The executable instructions or software code may be obtained from a readable medium (e.g., a hard drive media, optical media, RAM, EPROM, EEPROM, tape media, cartridge media, flash memory, ROM, memory stick, and/or the like). In fact, readable media can include any medium that can store information.

Figure 6:
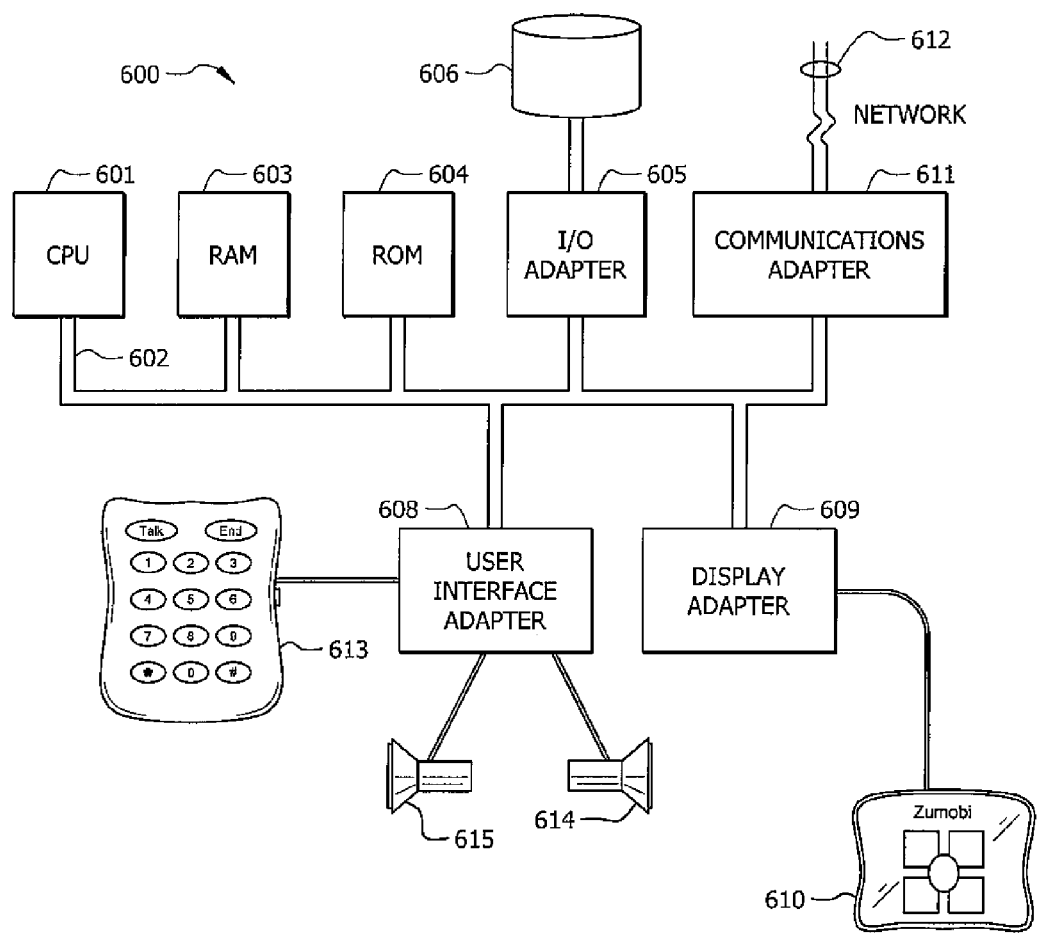
FIG. 6 illustrates an example computer system 600 adapted according to embodiments of the present invention.

FIG. 6 illustrates an example computer system 600 adapted according to embodiments of the present invention. It is understood that computer system 600 conforms to a basic exemplary architecture that is common to processor-based devices, such that computer system 600 comprises an example system on which embodiments of the present invention may be implemented (such the mobile device of FIG. 1). However, it is also understood that specific devices may vary in their architectures and still be encompassed in one or more embodiments of the invention.

Central processing unit (CPU) 601 is coupled to system bus 602. CPU 601 may be any general purpose CPU, special purpose CPU, or even a processor (or chip set) specially adapted for use in mobile devices. However, the present invention is not restricted by the architecture of CPU 601 as long as CPU 601 supports the inventive operations as described herein. CPU 601 may execute the various logical instructions according to embodiments of the present invention. For example, one or more CPUs, such as CPU 601, may execute machine-level instructions according to the exemplary operational flows described above in conjunction with FIGS. 2-5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, allow a user to interact with computer system 600 in order to input information, such as selection of an application.

I/O adapter 605 preferably connects to storage device(s) 606, such as one or more of hard drive, compact disc (CD) drive, floppy disk drive, tape drive, etc. to computer system 600. The storage devices may be utilized when RAM 603 is insufficient for the memory requirements associated with storing media data. Communications adapter 611 is preferably adapted to couple computer system 600 to network 612 (e.g., the Internet, a LAN, a cellular network, etc.). User interface adapter 608 couples user input/output devices, such as keyboard 613, microphone 614 speaker(s) 615, to computer system 600. Display adapter 609 is driven by CPU 601 to control the display on display device 610 (which may be a touchscreen adapted for use in a mobile device) to, for example, display tiles.

System 600 can be adapted as any of a variety of mobile devices, including, but not limited to, a cell phone, an email device (e.g., a BLACKBERRY device available from Research in Motion), a multi-media device (e.g., an IPHONE, available from Apple Inc.), a personal digital assistant, and the like. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of managing application updates on a mobile device; said method comprising:
   on said mobile device:
      setting update intervals for each of a plurality of applications, such that each application is assigned an update interval;
      dynamically adjusting said update intervals on an application by application basis based on a priority function for each of said applications which is automatically derived for each of said applications based on user context information and based on at least one factor selected from the list consisting of: known uses for each of said applications; time of day; frequency of use of each of said applications; bandwidth used for a period of time; battery usage; current device activity; bandwidth limitations over a network connection, wherein a first priority function for a first application of said plurality of applications sets a priority of said first application to a first priority level in response to a change in said user context information, and wherein said priority function modifies said priority of said first application to a second priority level over time; and
      retrieving updated application data over a network, said updated application data retrieved based at least in part on a current update interval and a current priority for each application, wherein said retrieving updated application data includes:
         coordinating use of a network connection by staggering said update intervals for said applications to avoid conflicts.

2. The method of claim 1 wherein said update intervals are calculated, at least in part, using factors that change over time.

3. The method of claim 1 further comprising:
   displaying updated data to a user through a screen on said mobile device.

4. The method of claim 1 further comprising:
   managing bandwidth usage of said mobile device by adjusting said update intervals.

5. The method of claim 1 further comprising:
   discerning a roaming status of said mobile device; and
   setting said update intervals based, at least in part, on said roaming status.

6. The method of claim 1 wherein retrieving updated application data comprises:
   performing said retrieving also based upon priority assignments of each of said applications.

7. A system comprising:
   a mobile device including a processor;
   a plurality of services executed by said processor, each of said services receiving information updates over a network connection from the mobile device to a server; and
   at least one update interval function executed by said processor assigning an update interval to each of said services, said update intervals governing when each of said services requests updated information over said network connection, wherein the update interval function is further configured to dynamically adjust the assigned update intervals to each of said services based on a plurality of usage factors and based on at least one factor selected from the list consisting of: known uses for each of said services; time of day; frequency of use of each of said services; bandwidth used for a period of time; battery usage; current device activity; bandwidth limitations over a network connection, and wherein such adjustment is made without further user interaction;

wherein there are N services and one update interval function, wherein the at least one update interval function staggers said update intervals of each said services so that update times for each said services do not conflict, and wherein, during an assigned update interval for a particular service of said plurality of services, a size of said information updates received from said server over said network connection are constrained based on a threshold.

8. The system of claim 7 wherein there are N services and N update interval functions, and each of said services corresponds to one update interval function, wherein N is greater than one.

9. The system of claim 7 wherein said at least one update interval function is aware of network characteristics and sets said update intervals based, at least upon, said network characteristics, wherein said network characteristics include a first characteristic indicating whether said network connection is a cellular network connection or a non-cellular network connection, wherein, when said first characteristic indicates that said network connection is the non-cellular network connection, said at least one update interval function shortens said update intervals to increase a frequency at which each of said services requests updated information over said network connection, and wherein, when said first characteristic indicates that said network connection is the cellular network connection, said at least one update interval function lengthens said update intervals to decrease said frequency at which each of said services requests updated information over said network connection.

10. The system of claim 7 wherein said mobile device comprises a screen for displaying updated information to a user.

11. The system of claim 7 further comprising:
at least one priority function assigning priorities to said services, each of said services requesting updates in accordance with its assigned priority.

12. The system of claim 7 wherein said at least one update interval function sets said update intervals based on one or more factors that change over time.

13. The system of claim 12 wherein said at least one update interval function sets said update intervals dynamically and changes said update intervals based on a change of said one or more factors.

14. The system of claim 7 wherein said plurality of usage factors includes usage patterns of said plurality of services.

15. A mobile device comprising:
a processor executing code to run a plurality of services on said mobile device;
a service manager running on said mobile device managing updating of application data for said plurality of services, said application data retrieved from one or more servers; and
one or more update interval modules running on said mobile device and dynamically setting update intervals for each of said services according to user context information relating to a type of data received by the mobile device and based on at least one factor selected from the list consisting of: known uses for each of said services; time of day; frequency of use of each of said services; bandwidth used for a period of time; battery usage; current device activity; bandwidth limitations over a network connection,
wherein said one or more update interval modules stagger said update intervals of said services so that update times for said services do not conflict,
wherein, during a first update interval, a first service receives a response to a first request from a first server, the response including updated application data for the first service and an indication of whether updated application data for a second service is available, and
wherein an update interval for the second service is determined based on whether the response to the first request indicates the updated application data for the second service is available from the first server.

16. The mobile device of claim 15 wherein said user context information includes one or more of: network characteristics, usage patterns, and user activity.

17. The method of claim 1 wherein said priority function for each of said applications which is automatically derived for each of said applications based on user context information including a plurality of network characteristics, usage patterns, and user activity.

18. The mobile device of claim 15, wherein the mobile device includes a plurality of service managers, and wherein services associated with a same server share a same service manager of the plurality of service managers and share a same connection.

* * * * *